Nov. 22, 1938.   C. A. RODMAN ET AL   2,137,655
APPARATUS FOR FREEZING AND DISPENSING COMESTIBLES
Filed Oct. 18, 1934   3 Sheets-Sheet 1

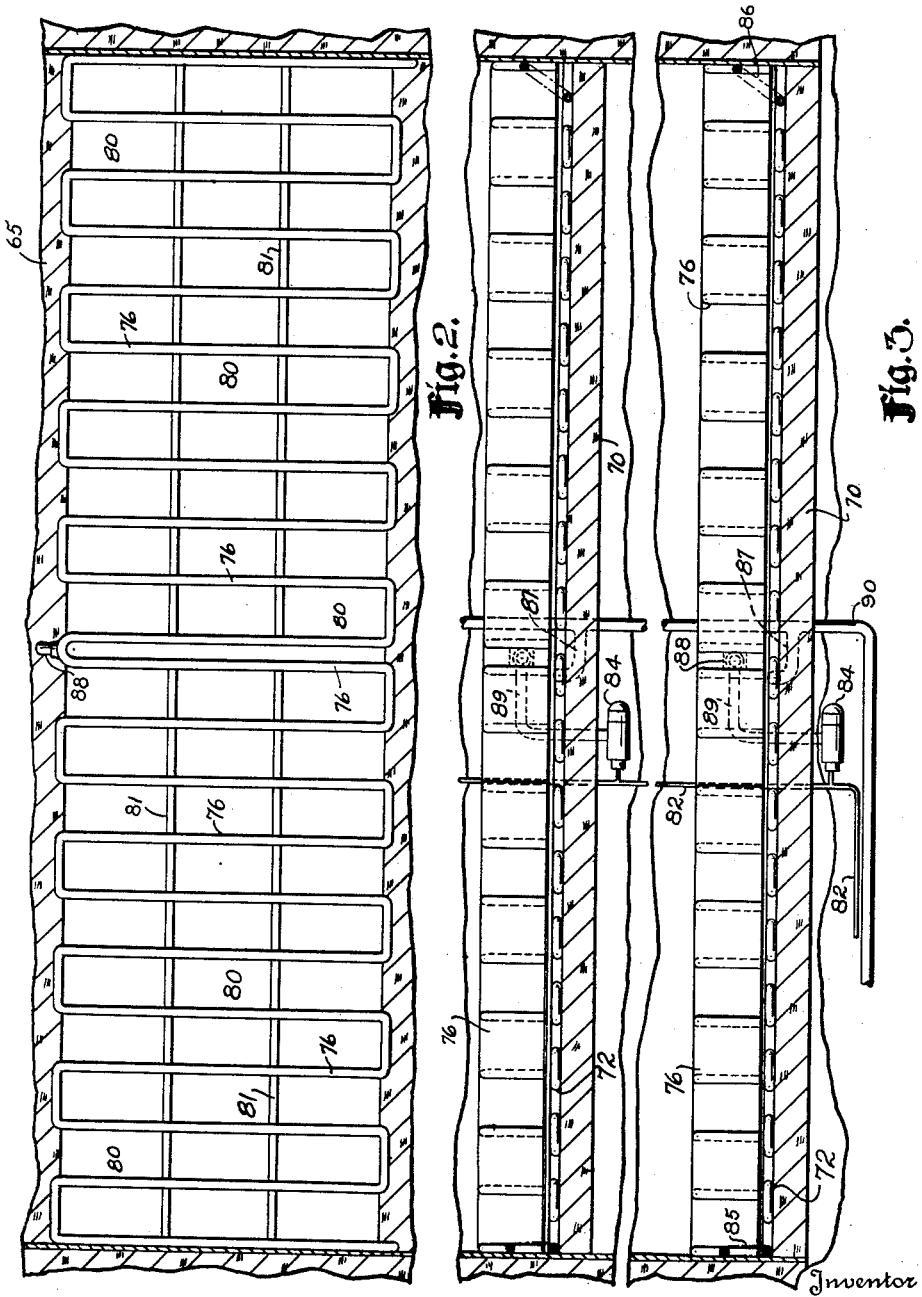

Nov. 22, 1938.    C. A. RODMAN ET AL    2,137,655
APPARATUS FOR FREEZING AND DISPENSING COMESTIBLES
Filed Oct. 18, 1934    3 Sheets-Sheet 3

Inventor
Clarence A. Rodman,
John B Tanner,
By Justin W Macklin.
Attorney

Patented Nov. 22, 1938

2,137,655

UNITED STATES PATENT OFFICE 2,137,655

APPARATUS FOR FREEZING AND DISPENSING COMESTIBLES

Clarence A. Rodman and John B. Tanner, Detroit, Mich.

Application October 18, 1934, Serial No. 748,882

4 Claims. (Cl. 62—114)

This invention relates to apparatus for freezing and dispensing comestibles.

For illustration of various frozen confections or articles of food we have referred hereinafter to ice cream, although our invention includes the freezing or congealing and dispensing of various kinds of ices, custards, ice creams and the like.

In the present method of dispensing or selling ice cream confections, particularly where put up in individual packages such as "chocolate-coated bars" or pieces known as "Frostbites, Eskimo Pies" or frozen custards etc. the cream or custard of chosen ingredients are usually mixed in liquid form. This is then chilled and whipped or beaten to aerate it. This increases its volume. While it is still in liquid or semi-liquid form, it is poured into molds or suitable containers and subjected to low temperatures, for example, zero Fahrenheit or below, for a period of several hours. All this is done at the manufacturing plant. The frozen foodstuffs may then be removed and packed in a refrigerating medium such as brine or dry-ice, salt ice, and it is well known that any of these are very difficult to handle, adding great weight and bulk in proportion to the volume or weight of the merchandise.

If it is intended to deliver the frozen confections in small individual pieces or cakes from a dispenser it is necessary to maintain this dispenser at a low temperature. This has heretofore been difficult of accomplishment, but it has been successfully provided for in a practical commercial container or apparatus such as shown, described and claimed in the co-pending application of Clarence A. Rodman, Serial No. 731,657, filed June 21, 1934, now Patent No. 2,009,817.

After the delivery of the goods by the present methods they are usually kept at the store or dispensing place in bulk in the refrigerated containers used for transporting them. These must be repeatedly opened and closed for delivery therefrom, and this frequently results in a part or all of the merchandise becoming softened or otherwise rendered unsalable or inedible. The difficulties in delivery and dispensing and corresponding expense has even rendered commercially impractical the sale of any large quantities of confections frozen in small individual articles.

Our system and apparatus contemplate eliminating all of the above and other difficulties and it is a general object of the invention to chill and mix ice cream ingredients ("ice cream" here as well as hereinafter being used illustratively), whereby the ingredients may be delivered to a dispensing point in liquid form and at normal or atmospheric temperatures. It may there be whipped and aerated partially congealed and then placed in suitable removable individual containers such as paper cups of uniform size, and in a specially constructed refrigerating and freezing apparatus, from which the frozen articles may be removed and immediately or within a few minutes, be placed in air conditioned refrigerated dispensing devices at or near the freezing unit.

Another object includes the construction of a chilling and aerating unit which reduces the materials or mixture to a low temperature as to cause very rapid freezing, accomplishing a complete satisfactory freezing in the matter of a few minutes as compared to the several hours now required. This unit, although hereinafter described in connection with a system of operation, is not to be considered as so limited in use since the unit has very wide use for chilling and aerating comestibles preparatory to freezing.

Our method of operation comprises chilling and aerating the comestible mixture and then subjecting the mixture to a freezing step in a refrigerating unit, whereupon the frozen articles, pieces or cakes are removed from the refrigerating unit and placed in an adjacent and cooperative dispensing unit with such convenience and in a short enough time that no substantial amount of rise in temperature is effected. The frozen cakes are subjected to such low temperature as to preserve them in such state indefinitely until delivered by coin controlled mechanism or otherwise.

The aerating and freezing unit used includes means for mixing the ingredients while aerating them and increasing their volume, efficiently and quickly chilling the mixture while maintaining it in uniformly liquid form and in a container from which the partially prepared ingredients or ice cream custards or the like may be poured or be conveniently delivered to specially constructed freezing trays of the freezing unit.

A form of our apparatus used in carrying out our system includes the use of a common refrigerating or freezing plant for a bank of dispensers, i. e. a plurality of air conditioned and chilled chambers of dispensing units with the freezing apparatus, and we also combine this freezing apparatus with pre-mixing and aerating means, chilled by connection with the same refrigerating unit as used for the freezing apparatus.

Summarizing our system and process, it comprises the steps of mixing, in liquid form a predetermined supply of ice cream ingredients sufficient for a large number of dispensing units; transporting the mixed batter without treatment as to atmospheric temperature to various points of dispensing; there subjecting the batter for a given number of dispensing units to a chilling and further mixing process, causing an increase in volume; pouring the mixed material into suitable individual containers placed in a refrigerating trough or forms in a freezing apparatus; subjecting the containers filled with the liquid mix to freezing or low temperatures produced by the expansion coil elements of a refrigerating unit thus rapidly completing the freezing and solidifying of the ice cream or the like; thereafter removing the individual pieces and placing them in dispensing chambers in which they are preserved and from which they are dispensed; and further includes the maintenance of the solid pieces at low temperatures by circulating chilled air over the pieces while in the dispensers, the air being chilled by passing it through a refrigerating coil arranged to have a passage leading to and from the refrigerated chamber. Our system further contemplates the conditioning of the air, that is, the maintaining of low dew or moisture content within the dispensing apparatus, and the system further contemplates the use of a method of defrosting and otherwise maintaining a minimum amount of frozen moisture in the dispensing apparatus.

Our invention includes the method of freezing, dispensing comestibles above referred to, and of which ice cream is only an illustration, and to which we do not desire to be limited, and the invention further includes the apparatus shown in the drawings which is more fully hereinafter described. The drawings illustrate a preferred embodiment of the aerating and chilling unit, the freezing apparatus, and a suitable dispensing means. While as indicated, the specific embodiment illustrates our invention, we do not intend to limit ourselves to the particular arrangement or to the embodiment shown and described, as this may be altered to meet varying conditions while still attaining the above outlined objects in a more or less commercially successful fashion.

In the drawings, Fig. 1 is a sectional front elevation showing the combined refrigerating units;

Fig. 2 is a sectional plan of one of the freezing trays;

Fig. 3 is a longitudinal sectional elevation of one of the trays showing the connections with the refrigerating circuit;

Figure 1:
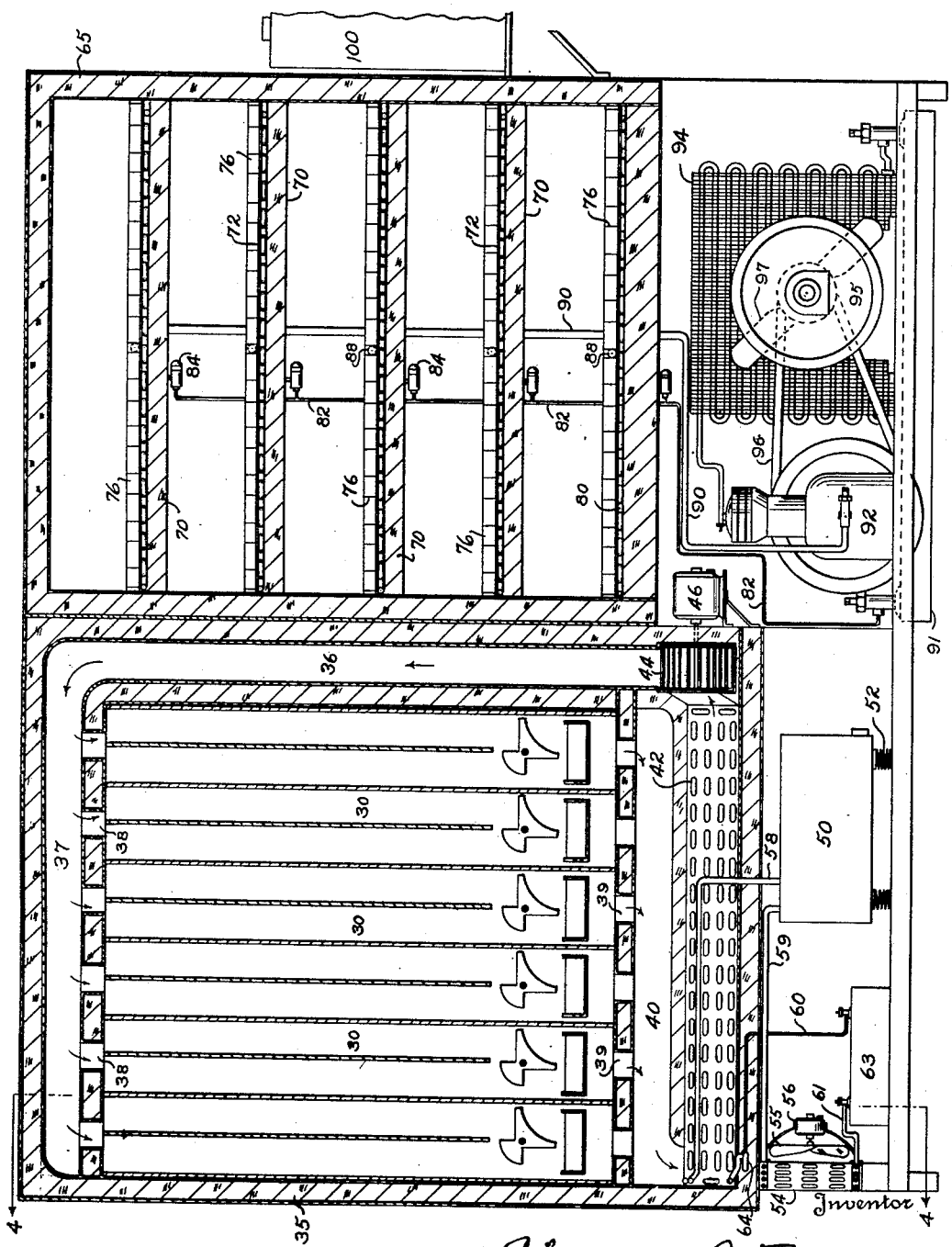
Figure 4:
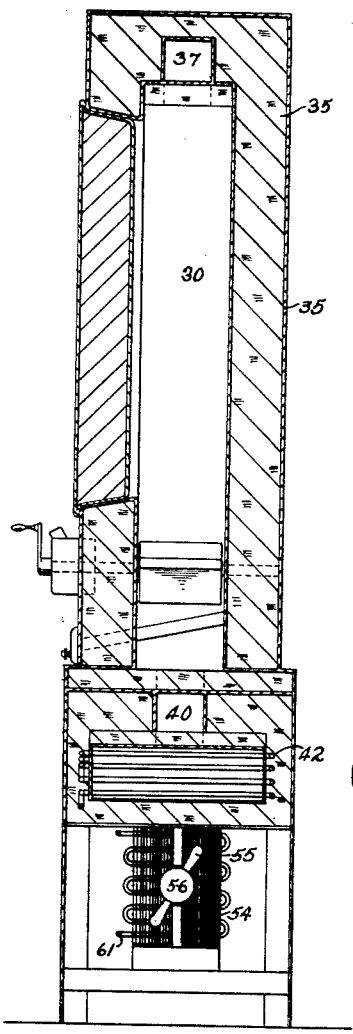
Fig. 4 is a vertical sectional view through the upper portion of the refrigerating device.
Figure 6:
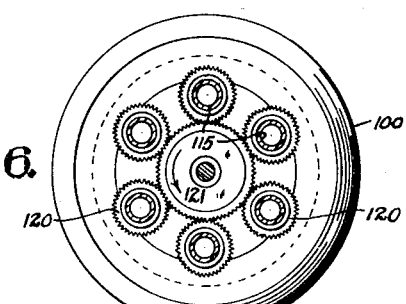
Fig. 6 is a transverse section through the mixing and chilling unit shown, taken along the line 6—6 of Fig. 5.
Figure 8:
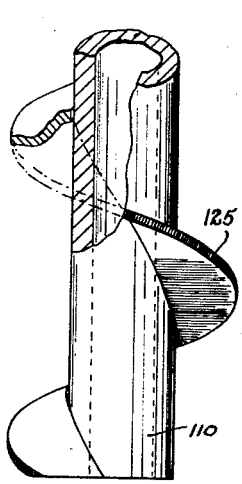
Fig. 8 is an enlarged view of one of the revolving worms and refrigerant tubes of the chilling unit.
Figure 5:
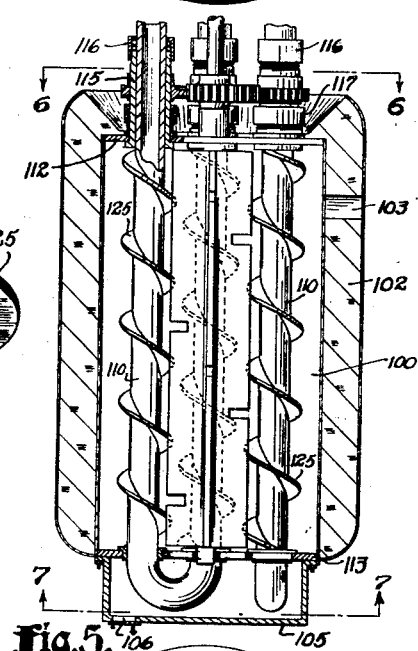
Fig. 5 is a vertical section through a mixing and chilling unit of special construction adapted for use in carrying out our rapid freezing and servicing system.
Figure 7:
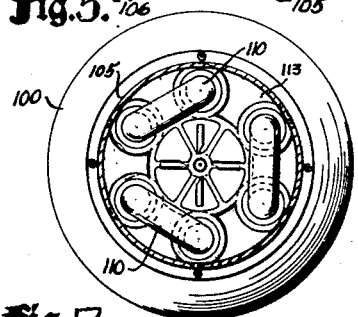
Fig. 7 is a transverse section taken along the line 7—7 of Fig. 5.
Figure 9:
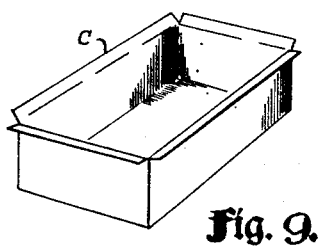
Fig. 9 is a perspective view of an illustrative form of container for an ice cream cake or like piece of merchandise adapted to be prepared and dispensed by the system provided by this invention.

Referring particularly to Figs. 1, 2 and 3, the dispensing unit at the left corresponds to that of the Rodman application Serial No. 731,657, Patent No. 2,009,817, hereinbefore referred to. For convenience its description is briefly as follows:—A series of vertical parallel dispensing chambers 30 carried in a suitable frame are inclosed by insulation 35. An air passage 36 extending up one side and across the top as at 37 communicates with openings 38 in the upper end of each of the dispensing chambers, which openings may carry suitable delivery means for merchandise, as described in Rodman's previous application. From the lower portion of these chambers orifices 39 join a common passage 40 leading to expansion coils which are enclosed in a horizontal passage leading to a fan 44 driven by a suitable motor 46 insulated from the fan.

The fan is preferably in the form of a radial blade or sirroco type, the cooled air entering it from the coils 42 passing outwardly therefrom and upward from the passage 36 and thence downwardly into the chambers 30 forming a closed return circuit of refrigerated air preferably maintained at or near zero F. temperature.

The refrigerating unit is suitably mounted in the enclosed, box-like container 50 and includes the compressor driving motor (not shown), and which container as here illustrated is mounted on springs 52. The condenser coil indicated at 54 is mounted underneath and supports the combined refrigerating and dispensing unit, and the coil is cooled by the fan 55 driven by a motor 56. The expansion and cooling coils are connected in the usual circuit arrangement by tubes 58, 59, 60, 61, the condenser storage tank being in a suitable container or box 63. A thermostat 64 on or adjacent to one of the reaches of the coils 42 governs the expansion valve, not shown.

The refrigerating unit comprises a rectangular upright case having insulation 65 and a plurality of horizontal trays therein mounted on suitable shelves indicated at 70. On these shelves are a series of horizontal coils 72 of substantially circular or round tube construction, above which may be a plate and from which rise hollow flat tube members 76 forming narrow trough-like compartments 80 preferably partitioned by cross members 81 to conform to the desired rectangular shape of the ice cream cake or comestible to be frozen.

The tubes 72 are connected to a common pipe or tube 82 governed by a series of individual expansion valves 84, one for each tray, and responsive to the condition of the tray. From the expansion valves the refrigerant passes through a tube 88 to the flat upright hollow partition-like tubes 76. These are connected at the ends by tubes 85, 86, with the tubes 72, so that in continued expansion the refrigerant passes through the various return bend passages of the tubes 76 to a common return point 87, and thence through the common tube 90 leading to the compressor 92.

The condenser coils are indicated somewhat diagrammatically at 94 and communicate with the storage tank 91 while the compressor 92 is driven by a suitable motor indicated at 95 through a belt 96 and the condenser coils may be cooled by the usual fan 97 shown preferably on the motor shaft.

In Figs. 5, 6, 7 and 8 is shown a freezing unit 100, 110, for the chilling and aerating of the liquid ice cream, and which may be located at or adjacent to the freezing unit 72 or may be used at a point separated therefrom, and the partially frozen ice cream taken to the freezing unit 72 of Figs. 1, 2, and 3 and there poured into containers 75 in the trays of the freezing shelves. Referring to these figures, 100 is a chamber or ice cream liquid container shown as enclosed in suitable insulation 102 and as having an inlet opening 103, while at the base is a catch basin 105 from which the ice cream may be drawn through an opening 106. In the chamber 100 there are a series of refrigerant conducting tubes 110, which are shown as extending through the tube wall 112 and as looped beneath the bottom wall 113. Surrounding these tubes above the outer wall are rotatable sleeves 115 having suitable packing joints 116 and 117 and on each of these sleeves is shown a gear pinion 120 driven by a sun or central gear 121. As the sleeves 115 rotate, these sleeves correspondingly rotate the connected worm blades 125. These blades are shown as spirally embracing tubes 110 within the chamber 100 and as they rotate they scrape off the accumulating freezing material from the tubes and at the same time agitate the mixture within the chamber. When the material is sufficiently mixed it is drained from the catch basin to a suitable container and thence poured in conveyors and conveying vessel, from which it is poured into the individual containers in which the cake or like piece of ice cream is frozen.

It is to be understood that many alterations can be made in the application of our system and in the modifications of apparatus used, without departing from the spirit of the invention as defined in the appended claims.

We claim:

1. A chilling and aerating device comprising a chamber adapted to receive a comestible mixture, insulation surrounding the chamber, a plurality of ducts extending through the chamber for conducting a refrigerating medium, a spiral blade embracing each of said ducts and projecting outwardly therefrom, and driving means connected with each of the blades for causing movement of the blades relative to the ducts.

2. A refrigerating apparatus comprising an insulating chamber having top and bottom walls, a plurality of tubes through one of said walls and returning therethrough for conducting a refrigerant, each of said tubes having a portion which is within the insulating chamber, a spiral scraper comprising a wing-like member embracing a part of the portion within the chamber of each of the tubes, driving means connected to each spiral scraper, and openings in said chamber for admitting to and for removing from the chamber the comestible mixture.

3. A chilling and aerating device comprising a chamber adapted to receive a comestible mixture, a duct leading through said chamber for expanding refrigerating medium, a spiral blade embracing said duct and projecting outwardly therefrom and in close contact therewith for agitating the mixture and for preventing the mixture from adhering to the duct.

4. A device for chilling and aerating comestible mixtures comprising a chamber having end portions, a U-shaped refrigerant duct supported by the end portions and having two parallel reaches within the chamber, an agitating means surrounding each of the reaches and being supported from one of the end portions, a driving means connected to each of the agitating means for causing movement of the agitating means relative to the reach, and an opening in the chamber for admission and discharge of the mixture.

CLARENCE A. RODMAN.
JOHN B. TANNER.